Figure 1:
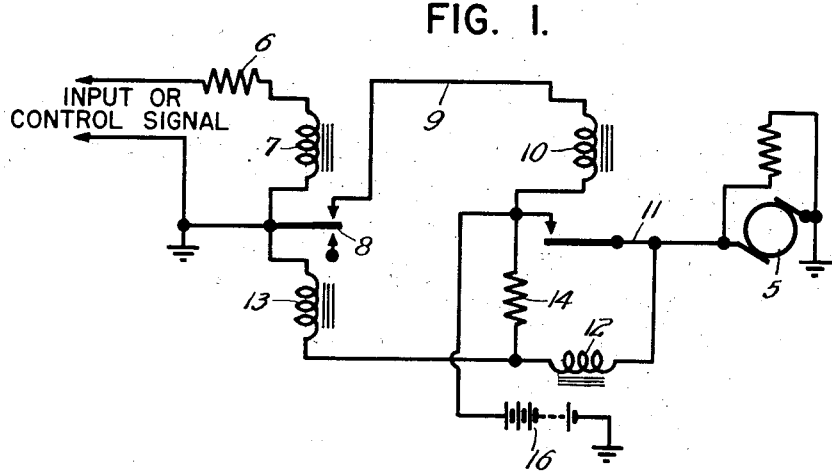

Jan. 1, 1952     F. G. WILLEY     2,581,158
RELAY-OPERATED AMPLIFIER
Filed May 5, 1949

INVENTOR
FRANK G. WILLEY
ATTORNEYS

Patented Jan. 1, 1952

2,581,158

UNITED STATES PATENT OFFICE 2,581,158

RELAY-OPERATED AMPLIFIER

Frank Gordon Willey, Roslyn Heights, N. Y., assignor to Servo Corporation of America, New Hyde Park, N. Y., a corporation of New York Application May 5, 1949, Serial No. 91,450

11 Claims. (Cl. 318—257)

My invention relates to servo amplifiers, and in particular to an improved means for driving an electric motor in response to a given control signal.

It is an object of the invention to provide an improved device of the character indicated.

It is another object to provide an improved amplifier suitable for driving an electric motor and not employing vacuum-tube or the like discharge devices.

It is also an object to provide an improved variable-speed motor control utilizing electromagnetic relays.

It is a further object to provide a multiple-stage relay-operated amplifier with stabilizing means to assure a smooth response.

Figure 2:
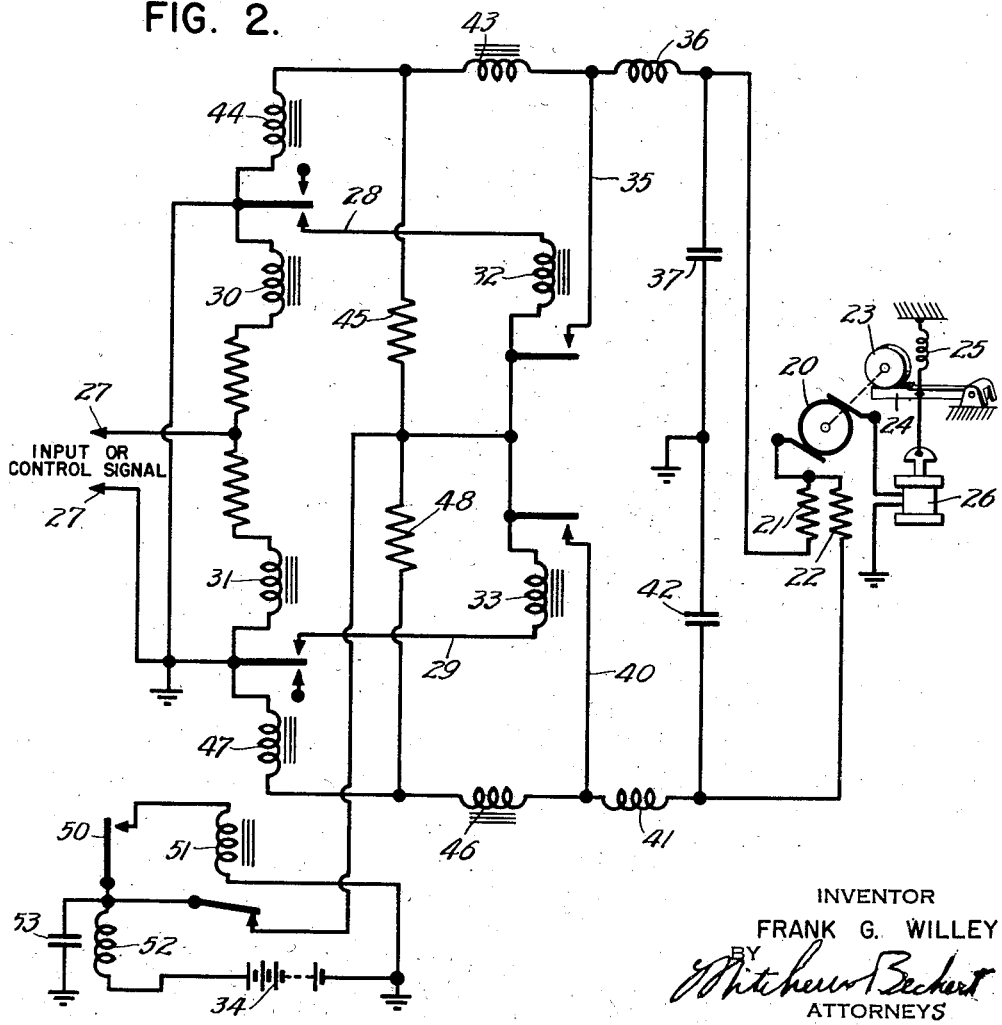

Other objects and various further features of the invention will be pointed out or will occur to those skilled in the art from a reading of the following specification. In the drawings, which show, for illustrative purposes only, preferred forms of the invention;

Fig. 1 schematically indicates a stabilized relay-operated amplifier for the variable-speed, unidirectional control of an electric motor; and Fig. 2 schematically shows another variable-speed motor-control amplifier of the invention.

Briefly stated, my invention contemplates a multiple-stage relay-operated amplifier having particular application to the driving of an electric motor in response to relatively weak input or control signals. In one preferred form, I employ first relay means including a winding responsive to the control signals to close a circuit to second relay means, which, in turn, may be operated from an external source. The second relay means, when operated, may close a circuit from the source to the motor, and a feedback connection (from the second relay means to the first relay means) in opposition to the polarity of the input signals may assure stability of operation and relative smoothness of response.

In another form to be described, the input signals may be applied directly to first relay means including a winding responsive to signals of a first polarity, in order to close the circuit to a winding of a second relay means; the first relay means may also be responsive to signals of opposed polarity to close a circuit to a second winding of the second relay means. Energizing the second relay means in one sense may be effective to supply control signals for driving a motor in a first direction, and energizing the second relay means in another sense may be effective to supply control signals for driving the motor in the reverse direction. Again, feedback means from the various output circuits of the second relay means may in each case be connected to the first relay means in effective opposition to the instantaneous polarity of input control signals; such feedback means may thus provide a means for stabilizing and smoothing the operation of the amplifier, regardless of the polarity of input signals.

Referring to Fig. 1 of the drawings, my invention is shown in application to a variable-speed unidirectional drive for a motor 5; various types of motor may be employed, and, in the form shown, the motor 5 is shunt-wound. The motor 5 is to be operated in accordance with relatively weak input or control signals, as received from a generator, potentiometer, or similar unit which may, in turn, have been actuated by a control system, such as an automatic pilot or gyroscope (not shown). The input signals thus available may be applied through a resistor 6 directly to a first winding 7 of a first electromagnetic-relay stage. Energizing the winding 7 may displace the relay armature 8 to close an output circuit 9, which may include the winding 10 of a second-stage relay. Power for the second-stage relay 10 may be provided by an external source, such as the battery 16. When sufficiently energized, the second-stage relay 10 may cause an output circuit 11 to supply driving voltage to the motor 5.

In accordance with a feature of the invention, I provide means for feeding-back energy from the output circuit 11 of the second-stage relay effectively to the input of the first-stage relay, so as to oppose or stabilize the influence of the control signals upon operation of the armature 8. In the form shown, such feedback connection includes choking means 12 in a line from the output circuit 11 to a second winding 13 of the first-stage relay. The time response of the feedback circuit (or, stated in other words, the delay imposed by the choking means 12 in the feedback line) may be as great as, and preferably in excess of, the delay or time response of the first-stage relay in closing the circuit 9. A biasing resistor 14 between the source 11 and the feedback or balancing winding 13 may assure that the armature 8 will respond only to control signals greater than those of a minimum level.

In operation, a control signal of magnitude exceeding the said minimum level will be effective to close the first-stage output circuit 9, and thus to close the second-stage relay 10 to supply a voltage for driving the motor 5. As soon as this voltage is applied to the motor 5, a feedback voltage is generated and applied (with a delay governed by the properties of the choke 12) to the winding 13. Now, if the control voltage which closed the armature 8 in the output circuit 9 was characterized only by a relatively small magnitude in excess of the minimum level for operating the first-stage relay, then the feedback connection may be effective to break the circuit 9 after a relatively short period, and the feedback energy applied to the choking means 12 will have to be substantially fully dissipated before the control signal may again be effective to close the first-stage output circuit 9. Such a cycle of operation may mean relatively short intervals of applied voltage for driving the motor 5 and relatively long intervals between such applications of driving voltage to the motor 5. If, on the other hand, the magnitude of the control signal is more substantially in excess of the minimum level for operating the first-stage relay, then it will be clear that a more substantial feedback voltage (requiring a longer time to generate in the circuit of choke 12) will be needed to open the first-stage output circuit 9. Under the latter circumstances, therefore, the motor 5 will receive driving voltage for longer intervals, and the periods between such applications of driving voltage will be shorter.

Thus, it will be clear that, depending upon the magnitude of the control signal and providing, of course, that said magnitude exceeds the minimum level for operation of the first-stage relay means, the motor 5 may be subjected to greater or less average magnitudes of applied voltage. In actual practice I have found that the average magnitude of driving voltage supplied to the motor 5 may, for a considerable spread of control-voltage magnitudes, be linear or very substantially linear with the control voltage.

In Fig. 2, I show an application of the principles of my invention to a relay-operated amplifying means for driving a reversible motor 20, which may be the driving motor of an aircraft-control actuator. The motor 20 may include two split windings 21—22 (which happen to be shown series-connected to the armature), so that, when the winding 20 is energized, the motor may be driven in a first direction and, when the winding 22 is energized, the motor may be driven in the opposite direction. In the forms shown, the actuator mechanism of which the motor 20 forms a part may include braking means, such as a drum 23 to be engaged by a shoe 24. Spring means 25 may normally urge the shoe in braking contact with the drum 23 and, whenever driving voltage is applied to the motor 20, a braking solenoid 26 may be energized to release the brake shoe 24.

In the form shown, the motor 20 is to be reversibly driven in accordance with the instantaneous polarity of control signals to be applied between input terminals 27. The input signals may be applied continuously to first-stage relay means responsive to signals of a first polarity in order to close a first output circuit 28, and responsive to signals of opposed polarity to close a second output circuit 29. In the form shown, a first relay winding 30 responds to one polarity to close the circuit 28 and another winding 31 responds to signals of opposed polarity to close the circuit 29. The circuit 28 may include a second-stage relay winding 32, and the circuit 29 may include a second-stage relay winding 23; both windings 32—33 may be operated from a common power source such as the battery 34. Energizing the relay winding 32 is effective to close an output circuit 35, which may be connected directly to one winding (21) of the actuator motor 20 and, if desired, smoothing elements such as a series inductance 36 and a capacitance 37 to ground may be included in the output circuit 35; the smoothing elements 36—37 may be designed to attenuate high-frequency components of the signals generated in the output circuit 35. In a similar manner, the second-stage relay winding 33 may, when energized, complete a further output circuit 40 for applying a driving voltage to the reverse winding 22 of the actuator motor 20; again, suitable smoothing means 41—42 may be included in the output circuit 40.

In accordance with a feature of the invention, both output circuits 35—40 may be so connected in feedback relation with the input to the first relay means as to stabilize the amplifier for either polarity of operation of the amplifier. In the case of the output circuit 35, the feedback connection may include choking means 43 directly connected to a winding 44 operating in opposition to the winding 30 and effective to open the circuit 28 upon the generation of a sufficient feedback voltage. If desired, biasing means, such as a resistor 45 connected to the source 44, may also be applied to the winding 44 to assure that the circuit 28 will not be closed except for signals above a given minimum level. In the case of the output circuit 40, the feedback connection may include a choke 46 connected to a further winding 47 of the first-stage relay means, and this connection may be so poled as to open the circuit 29 upon generation of a sufficient feedback voltage; again, a biasing resistor 48 may be included in the feedback circuit to determine the minimum control-signal level at which the circuit 29 will be closed.

In operation, let it be assumed that a control signal of a first polarity, and in excess of the minimum level determined by the biasing means, is effective to close the circuit 28. The relay 32 will then be operated, and the motor winding 21 will be energized to release the brake 24 and to drive the motor 20. At the same time, a feedback voltage will begin to develop in the winding 44 and, when this voltage reaches a suitable magnitude to offset the effect of the instantaneous control-voltage magnitude, the circuit 35 to the motor will be interrupted and the brake 24 will be applied. As soon as the feedback voltage is effectively dissipated, and assuming that the same control signal is still being applied, the circuit 28 will again be completed, the brake 24 released, and the same motor winding 21 will be excited. Driving voltages will be applied to the winding 21 for periods directly proportional to the virtually instantaneous magnitude of the control voltage, and the time intervals between applications of the driving voltage to the winding 21 will be inversely proportional to the magnitude of the control voltage. Thus, the motor 20 will be driven by the winding 21 at a speed that is proportional to the magnitude of the control signal, as long as that signal is of the said first polarity. Upon a polarity reversal in the control signal, it will be clear that the other half of the amplifier means will be similarly effective to drive the motor 20 in the reverse direction via the motor winding 22.

It has been indicated that the arrangement of Fig. 2 may have particular application to automatic control of an aircraft-control surface in response to the output of some automatic sensing means, such as a gyroscope. Under certain circumstances, it may be desirable to override such automatic control with a manual operation, and for that eventuality I have provided a manual switch 50 effective to open a normally closed relay 51 for applying the source 34 to the amplifier. If desired, smoothing means 52—53 may be included in the circuit of the contacts of relay 51.

It will be appreciated that I have described a relatively simple amplifier construction for the smooth control of an electric motor or the like. My amplifier makes use of electro-magnetic means and does not require vacuum tubes, and substantial amplifier gain may be achieved. Nevertheless, I achieve well-stabilized operation with a plurality of amplifier stages. In practice, it has been found that the output speed of the motor or other means driven by my amplifier may be substantially linearly related to the magnitude of applied control voltage.

While I have described my invention in detail for the preferred forms shown, it will be understood that modifications may be made within the scope of the invention as defined in the appended claims.

I claim:

1. In a device of the character indicated, a first relay including an armature, an input-signal winding for actuating said armature in one direction and a feedback-signal winding for actuating said armature in the opposite direction, a second relay having a winding to be energized by the output of said first relay, and a feedback connection between the output of said second relay and said feedback-signal winding.

2. In a motor-controlling device of the character indicated, a first relay including an armature, a control-signal winding for actuating said armature in one direction, and a feedback-signal winding for actuating said armature in the opposite direction, a second relay connected for operation by said first relay and from an external source of power, the output circuit of said second relay including means for connection to a motor, and feedback means from said output circuit and connected to said feedback winding of said first relay.

3. In a device of the character indicated, a first stage including a first relay responsive to control signals of one polarity and a second relay responsive to control signals of opposed polarity, a second stage including a third relay responsive to operation of said first relay and a fourth relay responsive to operation of said second relay, an output connection for said third relay for supplying means to be operated in a first sense, an output connection from said fourth relay for supplying means to be operated in an opposed sense, and feedback means between the output of said third relay and the input of said first relay and between the output of said fourth relay and the input of said second relay.

4. In a device of the character indicated for driving a motor having a first winding for one direction of rotation and a second winding for another direction of rotation, first relay means responsive to a first polarity of input signal to control a first output circuit and responsive to an input signal of opposed polarity to control a second output circuit, second relay means including means responsive to operation of said first circuit to control the first motor winding, said second relay means also including means responsive to operation of said second circuit to control the second motor winding, and feedback means responsive to operation of said second relay means and effectively connected to the input of said first relay means in poled opposition to the input signal applied to said first relay means.

5. A device according to claim 4, in which the output circuits of said second relay means include smoothing means, whereby high-frequency components of signals generated in the output circuits of said second relay means may be attenuated.

6. A device according to claim 4, in which the output circuits of said first relay means and of said second relay means are connected for operation from a common source.

7. In an amplifying system for reversibly driving a motor in response to input signals of changing polarity, first relay means including a first winding responsive to input signals of one polarity to close a first output circuit, and a second winding responsive to input signals of opposed polarity to close a second output circuit; second relay means including a winding in said first output circuit to close a first control circuit, and a winding in said second output circuit to close a second control circuit; a feedback connection from said first control circuit and connected to said first relay means to open said first output circuit, and a feedback connection from said second control circuit and connected to said first relay means to open said second output circuit.

8. In a device of the character indicated, a first relay including an armature, an input-signal winding for actuating said armature in one direction, and a feedback-signal winding for actuating said armature in the opposite direction, a second relay having a winding to be energized by the output of said first relay, said second relay including an armature with an input terminal and an output terminal, and feedback-connection means for said feedback winding including a smoothing impedance connected to one of said terminals and a biasing impedance connected to the other of said terminals.

9. A device according to claim 8, in which said smoothing impedance is a choke.

10. A device according to claim 8, in which said biasing impedance is a resistor.

11. A device according to claim 8, in which said biasing impedance is connected to said input terminal, and in which said smoothing impedance is connected to said output terminal.

FRANK GORDON WILLEY.

REFERENCES CITED

The following references are of record in the file of this patent:

UNITED STATES PATENTS

| Number | Name | Date |
|---|---|---|
| 1,689,516 | Bliss | Oct. 30, 1928 |
| 2,022,097 | Uehling | Nov. 26, 1935 |
| 2,062,915 | Lamb | Dec. 1, 1936 |

FOREIGN PATENTS

| Number | Country | Date |
|---|---|---|
| 260,291 | Great Britain | Sept. 28, 1927 |